C. L. HOFF.
ELECTRIC CHAIN WELDING MACHINE.
APPLICATION FILED NOV. 20, 1908.
978,160.
Patented Dec. 13, 1910.
4 SHEETS—SHEET 1.
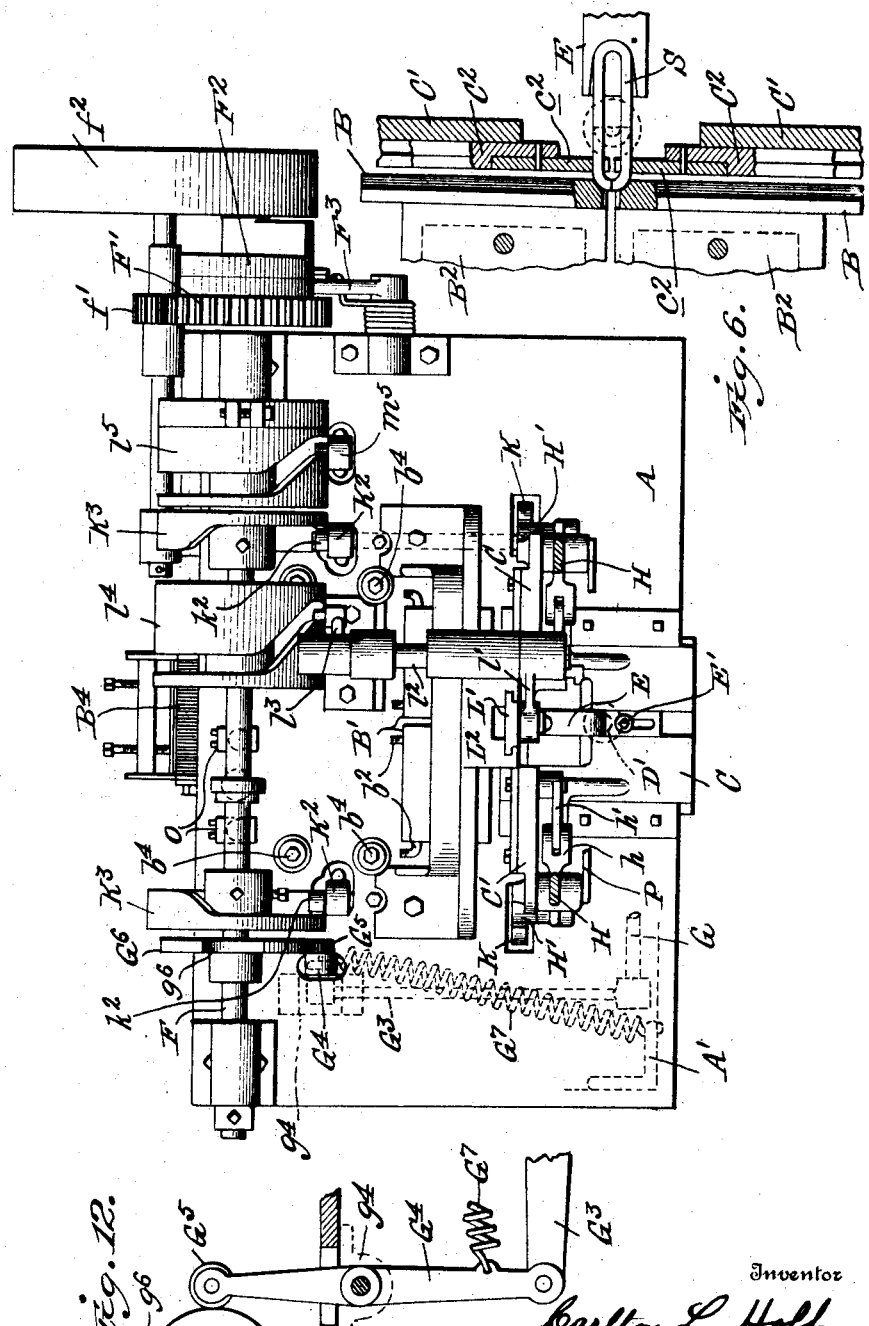
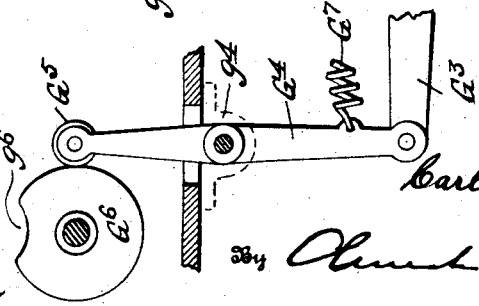
Witnesses
Inventor
Carlton L. Hoff.
By
his Attorneys

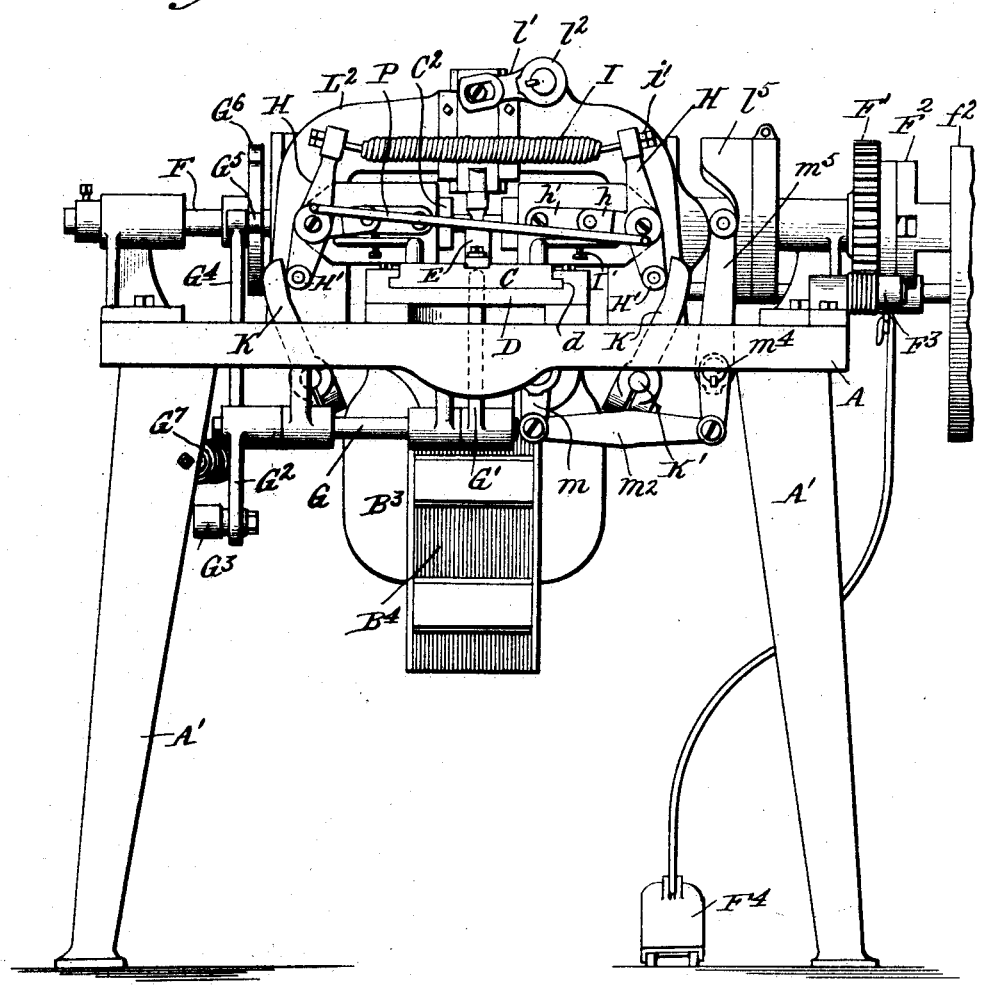

C. L. HOFF.
ELECTRIC CHAIN WELDING MACHINE.
APPLICATION FILED NOV. 20, 1908.
978,160.
Patented Dec. 13, 1910.
4 SHEETS—SHEET 3.
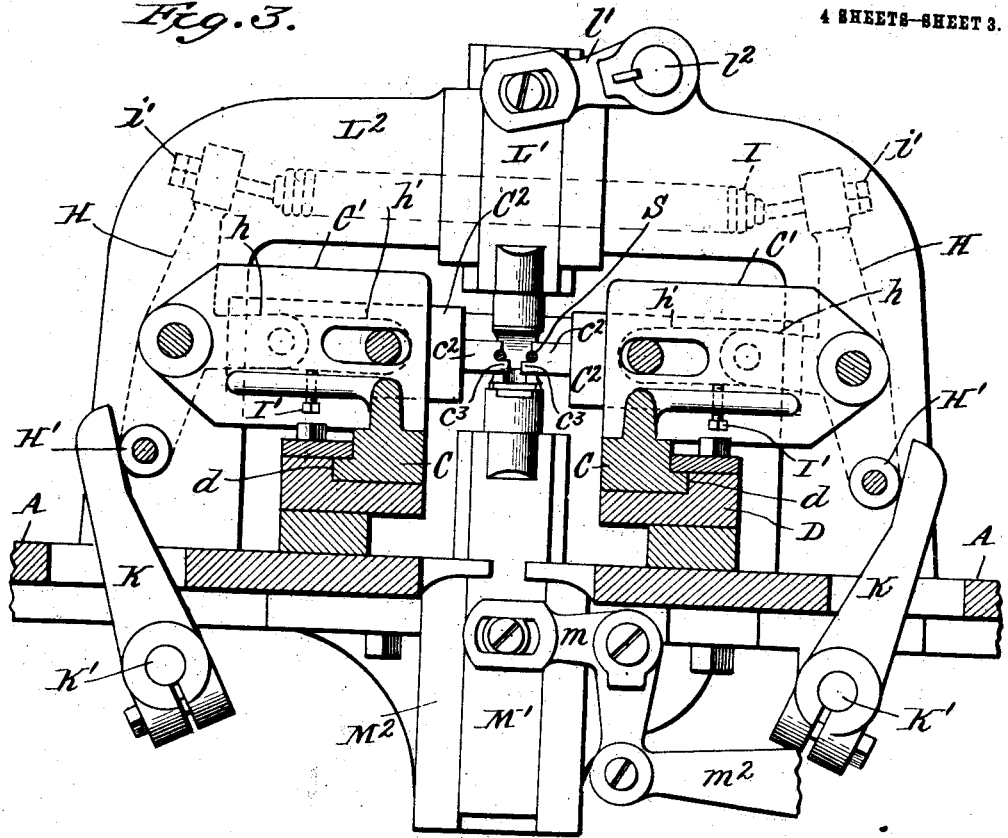
Fig. 3.
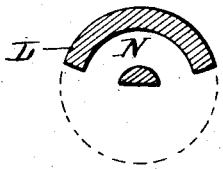
Fig. 7.
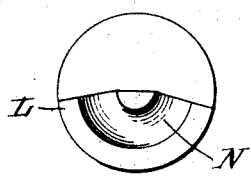
Fig. 8.
Fig. 9.
Fig. 10.
Fig. 11.
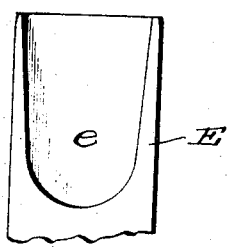
Witnesses
Inventor
Carlton L. Hoff,
By Church & Church
his Attorneys.

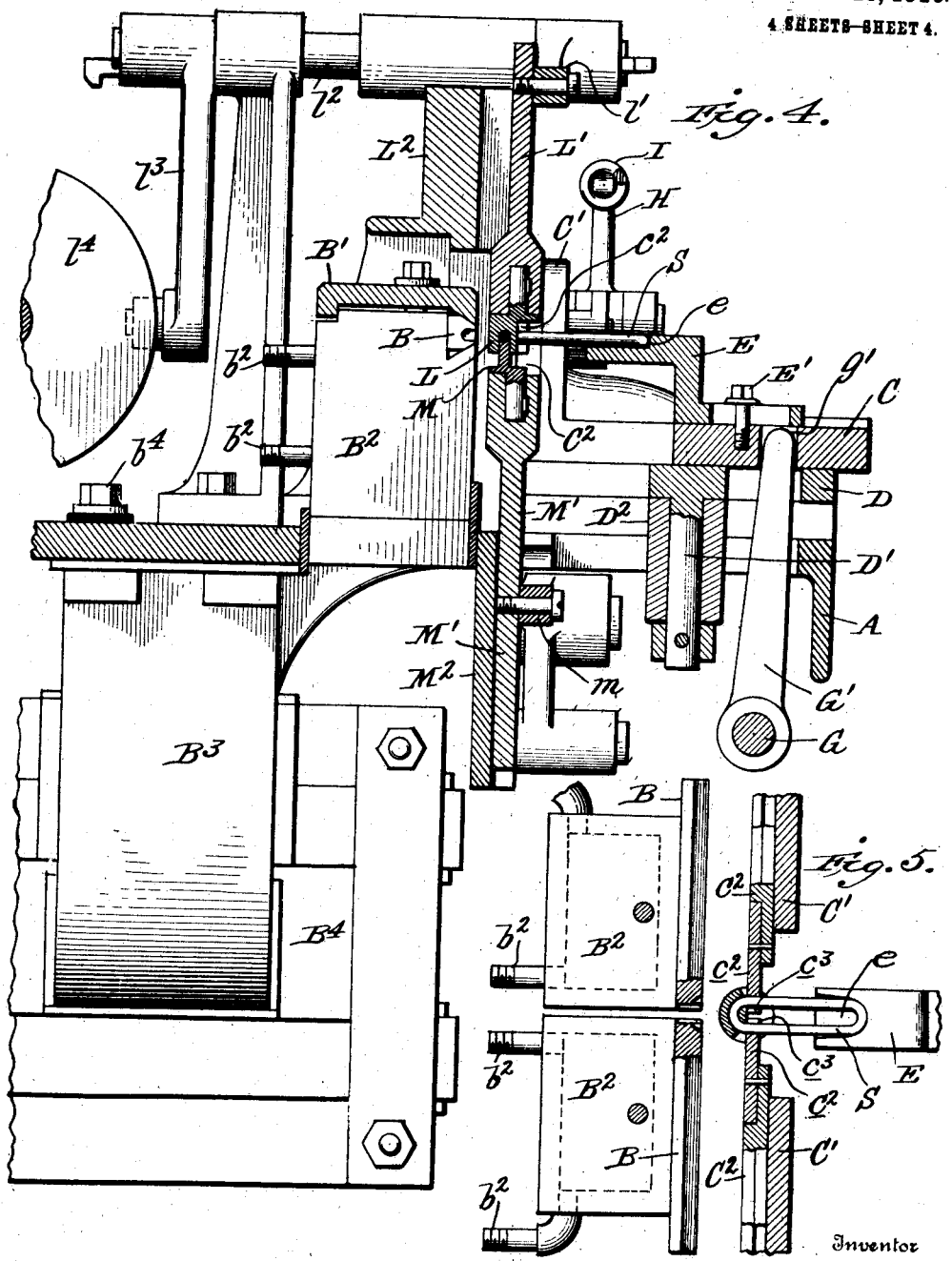

UNITED STATES PATENT OFFICE.

CARLTON L. HOFF, OF YORK, PENNSYLVANIA, ASSIGNOR TO STANDARD CHAIN COMPANY, OF YORK, PENNSYLVANIA, A CORPORATION OF PENNSYLVANIA.

ELECTRIC CHAIN-WELDING MACHINE.

978,160.      Specification of Letters Patent.      Patented Dec. 13, 1910.

Application filed November 20, 1908. Serial No. 463,621.

*To all whom it may concern:*

Be it known that I, CARLTON L. HOFF, of York, York county, Pennsylvania, have invented certain new and useful Improvements in Electric Chain-Welding Machines; and I do hereby declare the following to be a full, clear, and exact description of the same, reference being had to the accompanying drawings, forming a part of this specification, and to the figures and letters of reference marked thereon.

One of the objects of the present invention is to provide a machine with which the current losses due to short circuiting and resistance at points other than the welding point shall be reduced to a minimum.

Another object of the invention is to provide a machine with which either short or long links may be welded with equal facility and with a practically uniform current consumption.

Another object of the invention is to improve and simplify the mechanism including the arrangement of the electrodes and link handling means, whereby more uniform and certain results are secured and a higher welding rate may be maintained.

The invention consists primarily in a welding machine having its electrodes mounted in fixed position with relation to each other and to the transformer, and provided with suitable mechanical means for handling the links and presenting the same to and withdrawing the same from the electrodes, the links themselves, when desired, constituting the means for controlling or establishing and breaking the welding circuit.

The invention further consists in certain novel details of construction and combinations and arrangements of parts all as will be now described and pointed out particularly in the appended claims.

In the accompanying drawings: Figure 1 is a top plan view of a machine embodying the present invention. Fig. 2 is a front elevation of the same. Fig. 3 is a section showing the dies and jaws in front elevation. Fig. 4 is a section taken in a central vertical plane from front to rear, the transformer being in elevation. Figs. 5 and 6 are detail sectional plan views of the electrodes and jaws, Fig. 6 showing a link in welding position, and Fig. 5 showing a link in the position it occupies when first inserted and when being subjected to the action of the dies. Fig. 7 is a horizontal section through the upper die. Figs. 8 and 9 are face views, respectively, of the upper and lower dies. Fig. 10 is a plan view of the inner end of the link support and guide. Fig. 11 is a sectional elevation of the dies and one of the jaws on an enlarged scale. Fig. 12 is an elevation of the carriage retracting cam and lever.

Similar letters of reference indicate like parts in all the views.

The machine illustrated in the accompanying drawings and which embodies the present improvements is provided with a bed plate A, upon which the various parts of the machine are mounted, the said bed plate being itself supported on legs A' of such length that the dies, electrodes, etc., will be at a height convenient for the operator to present the links thereto. In the machines as constructed up to the present time the operator sits in front of the machine, although it will be understood that the bed plate may be elevated to a sufficient height for the operator to stand while operating the machine.

The electrodes forming the terminals of the welding circuit are mounted in fixed position, but are preferably adjustable to accommodate links of different size, to take up wear on their contact surfaces and to permit of ready removal and renewal. The said electrodes are lettered B in the drawings, and are held by clamps B' in dovetail recesses in the vertical faces of fixed electrode carriers $B^2$ which form the terminals of the secondary $B^3$ of the transformer $B^4$. The transformer is conveniently secured to the under side of the bed plate by bolts $b^4$, while the electrode carriers $B^2$ project above the said bed plate, as shown clearly in Fig. 4. The electrode carriers are preferably hollow and provided with pipe connections $b^2$ for the circulation of water or other cooling medium through the same, whereby excessive heating of the carriers or electrodes is prevented.

A link and jaw carrying carriage C is mounted in ways $d$ in a turn-table D to move toward and from the electrodes, said turn-table being preferably journaled on a vertical axis D', the bearing $D^2$ for which may be fixed with relation to the bed plate of the machine. At its inner end, the carriage C is provided with upwardly extending brackets C' in which transverse ways are formed for the reception of transversely movable jaw carriers C². Link gripping jaws c² between which the link is gripped and held during both its presentation to the electrodes, as shown in Fig. 6, and during its presentation to the dies, as shown in Fig. 5, are mounted on the carriers C².

For convenience in presenting the link in position to be gripped by the jaws, the jaws are provided with extensions c³, Fig. 3, which are at all times in position to form a support or rest upon which the forward end of the link may be placed, while the rear or outer end of the link is adapted to be carried by a link support and guide E, adjustably held on the carriage by a bolt E' and having a seat e in which the operator may place the outer end of the link when the latter is presented in position to be grasped by the jaws c². Inasmuch as the links are intended to be open at one end prior to their presentation to the machine, the seat e is of tapered form, as well illustrated in Figs. 5 and 6, the closing of the jaws on the link thus serving not only to grip and hold the link in position for presentation to the electrodes and dies, but also serving to close the link, thereby bringing the open ends of the same firmly together, or in proper contact relation to insure the heating of the ends of the link when the ends are seated between and bridge the opening between the electrodes.

Obviously, the jaws may be forced toward each other, and the carriage moved both toward and from the electrodes and pivotally on its center so as to center the links by suitable hand manipulation, but the present machine is designed for a power operation in which all of the movements shall be effected automatically.

The power mechanism preferably consists of a drive shaft F, having a gear wheel F' journaled thereon and receiving its motion from a pinion f' and pulley f², a one-revolution clutch F² controlled by a clutch lever F³ and treadle F⁴ being interposed between the gear wheel F' and the drive shaft F. With this arrangement, and in accordance with the well understood operation of one-revolution clutches, the drive shaft F will be brought to rest when it has made a single revolution, and in order to again inaugurate its movement the operator, by means of the treadle F⁴ withdraws the clutch arm F³, allowing the clutch to become effective, and the shaft is again arrested when it has made a single revolution. In each of its single revolutions, the shaft F is adapted to operate the mechanism to withdraw the carriage from its position in proximity to the electrodes, cause the dies heretofore referred to to make an effective reciprocation, open the link gripping jaws, holding them open for a suitable period, and then close said jaws and again permit the carriage to advance, the mechanism for accomplishing these movements being as follows: For advancing and retracting the carriage a shaft G journaled below the bed plate in proximity to its forward edge is provided with an arm G' extending up through the bed plate and turn-table into an opening g' in the carriage, whereby when the shaft G is turned through a short angle the carriage will be moved in one direction or the other. A downwardly extending arm G² on the shaft G is connected by a link G³ with the lower end of a carriage operating lever G⁴, centrally journaled in a bearing g⁴ on the bed plate and having a roller G⁵ at its upper end adapted to bear on a disk or cam G⁶ on the drive shaft. The said disk G⁶ is provided with a recess g⁶ into which the roller on the carriage operating lever passes and in which it remains while the said shaft is stationary, at which time a spring G⁷ connected with the lever G⁴ at one end and with the frame at the opposite end becomes effective to advance the carriage and force the link held thereby into contact with the electrodes. Angle levers H are journaled in the outer ends of the upwardly extending brackets C' of the carriage, one arm h of each lever being connected by a link h' with the said jaw carriers C² and forming with said links, toggle arms which, when brought down to the position indicated in Fig. 2, and in dotted lines in Fig. 3, will cause the said carriers and jaws to advance toward each other. The upper ends of the angle levers H are connected by a spring I, the tension of which may be adjusted through the connections i' with the levers, said spring operating to turn the levers in a direction to advance the jaws toward each other. The extent of such advance movement is limited by adjustable stops I', preferably in the form of set screws extending vertically in the brackets and into position for the toggle arms to contact therewith, whereby their downward swinging movement is arrested.

The lower ends or arms of the angle levers H are provided with rollers H' extending substantially parallel with the line of movement of the carriage and preferably of such length that they will occupy a position between arms K when the carriage is in either its advanced or retracted position. The arms K are mounted on rock shafts K', which shafts at their rear ends are provided with upwardly extending arms K², carrying rollers k², adapted to bear against face cams K³ on the drive shaft. Said cams K³ are oppositely disposed with relation to each other, and are so shaped and proportioned, that when the drive shaft is at rest, the arms K are open and the spring I is effective to hold the link gripping jaws closed. When the carriage has been retracted and after the dies have acted to give shape to the weld, the arms K are moved toward each other, thereby opening the jaws, which jaws are held open for a period or dwell sufficiently long to permit the operator to withdraw the welded link and place another link in position to be gripped by the jaws. The jaws are then allowed to close under the influence of the spring I and the carriage, together with the new link, is advanced to the position indicated in Fig. 6, i. e., with the forward end of the link seated firmly against and bridging the space between said electrodes. Inasmuch as it is desirable to give the weld a shape which will conform to the general cross section of the remaining portion of the link, vertically reciprocating dies L and M are provided for acting on the link when the same has been withdrawn from the electrodes and just prior to the opening of the jaws. The dies L and M are mounted in vertically movable slides L' and M', the ways for the slide L' being formed in a bridge L$^2$, and the ways for the slide M' being formed in a bracket M$^2$, depending from the bed plate of the machine. The upper die slide L' is operated by a crank arm l' carried by a rock shaft l$^2$, having at its rear end a crank arm l$^3$ adapted to coöperate with a cam l$^4$ on the drive shaft F. The lower die slide M' is operated by a bell crank lever m connected by a link m$^2$ and a crank arm m$^3$ on a rock shaft m$^4$ carrying at its rear end a crank arm m$^5$ adapted to coöperate with a cam l$^5$ corresponding in shape to the cam l$^4$. The cams l$^4$, l$^5$ are rigidly mounted on the shaft F, and are timed to cause the dies to advance simultaneously with a quick motion, immediately after the link and carriage have been withdrawn to the position indicated in Fig. 4, and to immediately recede, leaving the link free for removal as soon as the jaws have opened. The dies L and M which give shape to the weld are preferably cut away on the forward side, as shown clearly in Fig. 11, in order to afford space for the gripping jaws c$^2$ at a point in proximity to the end of the link, and the operating faces of the dies are preferably formed so as to shear off any surplus metal, thereby dispensing with the necessity of subsequently trimming the weld. This result is preferably secured by causing one of the dies to enter the other, for instance, the upper die L may be formed with a curved link receiving recess N, Figs. 7 and 8, and the lower die M is formed with a curved projection M' adapted to enter the recess N.

Conveniently, the contact faces of the electrodes B may be recessed for the reception of the ends of the link; although, if not recessed, practice has demonstrated the fact that the said faces will quickly wear until the ends of the link will seat firmly therein and be centered by the walls of the electrode.

In operation, the links S which are usually formed on a suitable machine and with one end open so that successive links may be hooked together, or passed one within the other, are presented one at a time by the operator during the period when the carriage is retracted and the jaws c$^2$ separated. When the jaws c$^2$ are in their open or separated position, the projections c$^3$ form positioning rests for the forward end of the link, and the guide E forms a positioning rest for the rear or outer end of the link. The drive shaft F being in motion when a link is placed in the position just described, the first succeeding movement effected is the closing of the jaws on the link, thereby forcing the two ends of the link together firmly and gripping the link in position on the carriage. The operator may now release his hold on the link, if he has not previously done so, and the subsequent movement of the machine will cause the carriage to advance with considerable pressure, due to the action of the spring G$^7$. The shape of the cam G$^6$ is such that the forward end of the link will strike the electrodes with a blow of considerable force, thereby insuring a perfect contact with the electrodes. Owing to the fact that the carriage is mounted on a turn-table, the link and carriage are free to swing laterally or to a sufficient extent to insure the centering of the end of the link between the electrodes, and, furthermore, inasmuch as the link is only in contact with the electrodes during the actual heating period, the electrodes and link constitute an efficient current controller which may be utilized in lieu of a mechanically operated switch, although, if so desired, an automatic switch of well known construction may be employed and operated from the drive shaft F. Such a switch is shown at O in Fig. 1 and is of a well known type forming no part of the present invention. To insure a uniform advance of the jaws, a connection is preferably provided between the jaw operating mechanisms and this connection may conveniently consist of a diagonal connecting rod P, Fig. 2, extending between the levers H, H, and pivotally connected with the same at equal distances on opposite sides of their pivotal centers. When the link has been advanced into contact with the electrodes and the welding circuit established, the drive shaft F is brought to rest by the disengagement of the one-revolution clutch F$^2$ and the operator again inaugurates the movement of the shaft only after he has determined by observation that the ends of the link have reached a welding point. Obviously, the time required for any particular link to reach a welding heat will depend upon various conditions, such, for instance, as the strength of the current, the perfection and area of the contact surface, and the cross section and conductivity of the end of the link itself, but, regardless of the variation in time due to these causes, there is only a negligible current loss due to the branching of the circuit through the link itself and through the parts of the machine in contact with the link, owing to the fact that such branch circuits are relatively long and of relatively high resistance. When the movement of the drive shaft is again inaugurated by the operator withdrawing the holding lever of the one-revolution clutch, the first movement causes the carriage to be withdrawn or retracted through the operation of the cam $G^6$ acting on the lever $G^4$, and immediately after the carriage has been withdrawn or retracted the dies are caused to advance by the cams $l^4$, $l^5$ acting on the crank arms $l^3$ and $m^5$. The dies make a quick forward stroke, immediately returning to their separated position and this is immediately followed by the opening of the jaws $c^2$ through the operation of the cams $K^3$, thereby freeing the welded link which may be removed by the operator and a new one inserted before the jaws again close and the carriage advances to present the link to the electrodes.

What I claim as new and desire to secure by Letters Patent, is:

1. In an electric chain link welding machine, the combination with the movable carriage and link gripping jaws mounted on and movable with the carriage, of the fixed welding electrodes constituting the circuit terminals, the link engaging faces of said electrodes being formed into a converging seat for centering and pressing the ends of the link together when advanced by the carriage.

2. In an electric chain link welding machine the combination with the terminal electrodes forming a seat between them for the end of a link, of gripping jaws for the link movable bodily toward and from the electrodes and pivotally mounted on an axis to swing transversely whereby the end of the link may be centered between the electrodes.

3. In an electric chain link welding machine the combination with the terminal electrodes forming a seat between them for the end of a link, of gripping jaws for the link, a carriage on which the jaws are mounted, movable toward and from the electrodes and a pivotal support for the carriage whereby the carriage and jaws may be turned to center the link between the electrodes.

4. In an electric chain link welding machine, the combination with the terminal electrodes forming a seat between them for the end of a link, of a carriage movable toward and from the electrodes, a guiding support for the rear end of the link and gripping jaws for the forward end of the link mounted on and movable with the carriage.

5. In an electric chain welding machine, the combination with the terminal electrodes forming between them a seat for the end of a link, of a pair of gripping jaws movable bodily in unison toward and from the electrodes and having supports for the forward end of the link extending in line with the lower edges of the jaws.

6. In an electric chain welding machine, the combination with the terminal electrodes forming between them a seat for the end of a link, of a pair of gripping jaws movable in unison toward and from the electrodes, each of said jaws having a projection on the under side, forming a support for a link and a support for the rear end of the link.

7. In an electric chain link welding machine, the combination with the fixed terminal electrodes and the reciprocatory dies in front of said electrodes, of a reciprocatory link gripping and carrying mechanism for presenting a link to the electrodes and subsequently transferring the same to the .

8. In an electric chain link welding machine, the combination with the fixed terminal electrodes and the reciprocatory dies in front of said electrodes, of a reciprocatory link gripping and carrying mechanism for presenting a link to the electrodes and dies successively and an operating mechanism for the dies, timed to reciprocate the dies when a link has been withdrawn from the electrodes by its gripping and carrying mechanism.

9. In an electric chain link welding machine, the combination with the fixed terminal electrodes and the reciprocatory dies located in front of said electrodes, of a link carrying carriage, a cam for imparting an intermittent movement to the carriage for transferring a link from one position to another, and means for returning the carriage to its initial position.

10. In an electric chain link welding machine, the combination with a transformer having terminal welding electrodes rigidly connected therewith, and reciprocatory dies for giving shape to the weld, of a reciprocatory transferring mechanism for transferring a link from the electrodes to the dies and operating mechanisms for alternately moving the transferring mechanism and dies.

11. In an electric chain link welding machine the combination with fixed electrode supports and a transformer with which said supports are rigidly connected, of welding electrodes mounted in said supports and adjustable toward and from each other, means for holding said electrodes in adjusted position whereby an adjusted link seat is formed between their proximate ends and a link carrying carriage movable toward and from said seat.

12. In an electric chain link welding machine, the combination with the fixed welding electrodes forming a seat between them for the end of a link, and a carriage mounted in ways to move toward and from the electrodes, of transversely movable link grasping jaws mounted in ways on the carriage, toggle arms for moving said jaws, and adjustable stops for limiting such closing movement.

13. In an electric chain link welding machine, the combination with the fixed welding electrodes forming a seat between them for the end of a link, and a carriage mounted in ways to move toward and from the electrodes, of transversely movable link grasping jaws mounted in ways on the carriage, toggle arms for moving the jaws, a spring for moving the toggle arms in a direction to close the jaws, and adjustable stops for limiting such closing movement.

14. In an electric chain link welding machine, the combination with the fixed welding electrodes forming a seat between them for the end of a link, and a link carriage mounted in ways to move toward and from said electrodes, of transversely movable link grasping jaws mounted on the carriage, levers on the carriage for operating said jaws, power operated levers mounted in fixed bearings, and coöperating with the levers on the carriage to open the jaws and a spring for closing the jaws.

15. In an electric chain link welding machine, the combination with the fixed welding electrodes forming between them a seat for the end of the link, of a link carrying carriage movable toward and from the electrodes, a spring for moving the carriage toward the electrodes, and means for retracting the carriage against the tension of the spring.

16. In an electric chain link welding machine, the combination with the fixed welding electrodes forming between them a seat for the end of the link, of a spring pressed carriage movable toward and from the electrodes, spring pressed link grasping jaws movably mounted on the carriage, and means for retracting the carriage and means for opening the jaws against the tension of the jaw closing spring.

CARLTON L. HOFF.

Witnesses:
H. C. BRENNEMAN,
A. J. BRENNEMAN.